(12) United States Patent
Pechnyk et al.

(10) Patent No.: US 9,096,130 B2
(45) Date of Patent: Aug. 4, 2015

(54) INTERIOR TRIM PANEL AND INTERIOR EQUIPMENT SYSTEM

(71) Applicant: Faurecia Innenraum Systeme GmbH, Hagenbach (DE)

(72) Inventors: Nicolas Pechnyk, Beavais (FR); Julien Seiller, Munich (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 14/356,591

(22) PCT Filed: Nov. 15, 2012

(86) PCT No.: PCT/EP2012/004754
§ 371 (c)(1),
(2) Date: May 6, 2014

(87) PCT Pub. No.: WO2013/072058
PCT Pub. Date: May 23, 2013

(65) Prior Publication Data
US 2014/0300090 A1    Oct. 9, 2014

(30) Foreign Application Priority Data
Nov. 15, 2011  (DE) .......................... 10 2011 118 575

(51) Int. Cl.
*B60R 21/16*      (2006.01)
*B60K 37/00*      (2006.01)
(Continued)

(52) U.S. Cl.
CPC ................ *B60K 37/00* (2013.01); *B60K 35/00* (2013.01); *B60R 21/215* (2013.01);
(Continued)

(58) Field of Classification Search
USPC ............................ 280/732, 731; 345/173–178
IPC ............................... B60K 37/00; B60R 21/2165
See application file for complete search history.

(56) References Cited

U.S. PATENT DOCUMENTS 5,333,901 A    8/1994  Barnes
5,691,695 A   11/1997  Lahiff
(Continued)

FOREIGN PATENT DOCUMENTS

| DE | 10133896 | A1 | 1/2003 | |
|---|---|---|---|---|
| DE | 10345917 | A1 | 4/2005 | |
| DE | 102005053176 | A1 | 5/2007 | |
| DE | 102009012417 | B3 | 6/2010 | |
| DE | 112008002093 | T5 | 7/2010 | |
| DE | 102010050699 | A1 | 8/2011 | |
| JP | 11263197 | A * | 9/1999 | ............ B60R 25/10 |

OTHER PUBLICATIONS
International Search Report for application No. PCT/EP2012/004754, dated Mar. 3, 2013, 2 pages.

*Primary Examiner* — Faye M Fleming
(74) *Attorney, Agent, or Firm* — Reising Ethington P.C.

(57) ABSTRACT

The invention relates to an interior trim panel (1) and to an interior equipment system (8) with an interior trim panel (1) for the interior (2) of a motor vehicle and with an airbag module which is fastened to said interior trim panel, wherein the interior equipment system comprises: the interior trim panel (1) which, when installed according to the specifications in a motor vehicle, has a first surface (11) facing an interior (2) of the motor vehicle and a second surface (12) placed opposite said first surface, and furthermore comprises: an interior trim panel basic body (4) with a recess (34) and with a fastening device (36) for the fastening of a display-covering device (300) of a display device (301), an airbag module holder (64) for the fastening of an airbag module (60), the airbag module (60) with an airbag module base part (61) and an airbag (62) which can be filled with gas, wherein the airbag module base part (61) is attached to the airbag module holder (64) on the second surface (12) of the interior trim panel (1).

20 Claims, 8 Drawing Sheets (51) Int. Cl.
  *B60R 21/215*   (2011.01)
  *B60K 35/00*    (2006.01)
  *B60R 21/2165*  (2011.01)

(52) U.S. Cl.
  CPC .. *B60K 2350/106* (2013.01); *B60K 2350/2043* (2013.01); *B60K 2350/2052* (2013.01); *B60K 2350/941* (2013.01); *B60R 21/2165* (2013.01); *B60R 2021/21537* (2013.01)

(56) References Cited

U.S. PATENT DOCUMENTS

| | | |
|---|---|---|
| 7,489,303 B1 | 2/2009 | Pryor |
| 8,576,199 B1 * | 11/2013 | Pryor .............................. 345/175 |
| 2010/0188204 A1 | 7/2010 | Okada et al. |
| 2012/0074674 A1 * | 3/2012 | Ohoka et al. ................ 280/728.3 |
| 2014/0062891 A1 * | 3/2014 | Powell .......................... 345/173 |

* cited by examiner

INTERIOR TRIM PANEL AND INTERIOR EQUIPMENT SYSTEM

TECHNICAL FIELD

The present invention relates to an interior trim panel for a vehicle and in particular an interior equipment system with an interior trim panel basic body and a display device section, wherein an airbag module holder and an airbag module can be provided.

BACKGROUND

Interior trim panels are known from the general prior art, in particular instrument panels which form an airbag covering region, which can be provided on the passenger side with an airbag flap. On the driver's side, it is usual that the airbag and the associated airbag flap are constructed in the steering wheel or in the steering column. It is therefore an object of the invention to provide an interior trim panel and an interior trim system, which is uncomplicated to produce and has a low risk of injury when an activated airbag opens the flap region covering the airbag.

SUMMARY

The above problem is solved by an interior trim panel according to claim 1 and an interior equipment system according to claim 10. Advantageous embodiments will emerge inter alia from the subsequent subclaims in the independent claims.

An embodiment of the interior trim panel according to the invention concerns an interior trim panel for the interior of a motor vehicle which, when installed according to the specifications in a motor vehicle has a first surface facing an interior of the motor vehicle and a second surface placed opposite said first surface, the interior trim panel comprising:
  an interior trim panel basic body with a recess and with a fastening device for the fastening of a display-covering device of a display device,
  an airbag module holder for the fastening of an airbag module with an airbag module base part and an airbag which can be filled with gas, which is situated in the region of the display device section and is arranged on the second surface of the interior trim panel.

Advantageously no measures have to be taken here in the decorative part of the interior trim panel or respectively in the hub of the steering wheel which can impair the aesthetic appearance thereof. In particular, weakening lines which must otherwise be provided in the decorative part and in the associated support layer and preferably must not be visible on the visible side of the passenger compartment, can be avoided in particular in the decorative part. The production of such hub weakenings in the steering wheel and/or weakenings in the interior trim panel is particularly complex. Therefore, the interior trim panel according to the invention can be produced at a more favourable price and materials can be used for the decorative part which are not suitable for corresponding weakenings.

In another embodiment of the interior trim panel according to the invention, the airbag module holder is attached to the second surface of the interior trim panel such that an airbag contained in an airbag module base part can be deployed into the interior through the recess. This has the advantage that the space which is otherwise used for the instrument display can also be used for an airbag, wherein the necessary weakenings can be provided by the recess, in order to ensure a reliable expanding of the airbag.

In a further embodiment of the interior trim panel according to the invention, the airbag module holder is attached to the second surface of the interior trim panel such that an airbag contained in an airbag module base part can be deployed through the decorative circumferential edge of the interior trim panel basic body adjoining the display device section and defining the recess. This has the advantage that the recess can provide several functions and not only serves to receive a display, but is also used as a passage for an expanding airbag.

In an embodiment of the interior trim panel according to the invention, the decorative part of the interior trim panel basic body extends over the recess. The decorative part here is a lamination layer which covers both the recess and also a display, which advantageously is not visible when an image generation device is switched off. Therefore, a particularly aesthetic impression can be given.

In an embodiment of the interior trim panel according to the invention, the display device section is constructed for pivoting open by an expanding airbag, and a pivoting device is constructed on the decorative circumferential edge, about which the display device section is pivoted open by the expanding airbag, and the covering receiving device or the predetermined breaking points of the display device section are constructed on a decorative circumferential edge of the decorative part.

In another embodiment of the interior trim panel according to the invention, the display device section is constructed as a U-flap system for pivoting open by the expanding airbag. This has the advantage that the display device section does not have to be suitable for swinging open centrally, but rather only at the outer edges, and a potential destruction of the display device section in the case of a central arrangement of weakenings can be avoided.

In an embodiment of the interior trim panel according to the invention, the display device section is constructed as an H-flap system for pivoting open by the expanding airbag. This is advantageous when the display device section is constructed merely from a projection film, into which predetermined tearing points can be introduced in an uncomplicated manner.

In a further embodiment of the interior trim panel according to the invention, a predetermined tearing point/weakening is formed in the interior trim panel basic body, in the decorative part and/or in the display device section, such that the expanding airbag can push open the display device section.

In an embodiment of the interior trim panel according to the invention, a covering receiving device for the detachable holding of the display device section is constructed on the decorative circumferential edge defining the recess, such that the covering receiving device frees the lateral edge of the display device section held by the covering receiving device when the expanding airbag strikes against the display device section or is activated.

An embodiment according to the invention concerns an interior equipment system with an interior trim panel for the interior of a motor vehicle and an airbag module fastened thereon, wherein the interior equipment system has:
  the interior trim panel which, when installed according to the specifications in a motor vehicle has a first surface facing an interior of the motor vehicle and a second surface placed opposite said first surface, and has furthermore:

an interior trim panel basic body with a recess and a fastening device for the fastening of a display-covering device of a display device, an airbag module holder for the fastening of an airbag module, the airbag module with an airbag module base part and an airbag which can be filled with gas, wherein the airbag module base part is attached to the airbag module holder on the second surface of the interior trim panel.

In a further embodiment of the interior equipment system according to the invention, the airbag module is attached to the airbag module holder on the second surface of the interior trim panel such that an airbag contained in an airbag module base part can be deployed into the interior through the recess.

In a further embodiment of the interior equipment system according to the invention, the airbag module holder is attached on the second surface of the interior trim panel such that an airbag contained in an airbag module base part can be deployed through the decorative circumferential edge of the decorative part, defining the recess, which adjoins the display device section. This has the advantage that no particular measures are necessary at other locations in the interior trim panel basic body for a passage of an airbag.

In a further embodiment of the interior equipment system according to the invention, the display-covering device has a projection display side which faces the interior of the passenger compartment and has a projection surface, wherein an image generation device is arranged in the projection surface. This has the advantage that the display-covering device can fulfil a dual function as a display and as a passage for an airbag.

In another embodiment of the interior equipment system according to the invention, the image generation device is an OLED-, AMOLED device, which is integrated in the projection inner side. This has the advantage that the image generation device can be used additionally as a touchscreen.

In another embodiment of the interior equipment system according to the invention, the display-covering device is arranged pivotably on the decorative part by means of a pivoting section, such as a film hinge, such that the display device section is able to be pivoted open by an expanding airbag. This has the advantage that the pivoting of the display-covering device can be carried out in a controlled manner via the pivoting section, wherein in addition an arresting net or arresting strap can be integrated in the pivoting section, in order to prevent a tearing off of the display-covering device.

In another embodiment of the interior equipment system according to the invention, the display-covering device has a projection display side which faces the interior of the passenger compartment and a projection surface, wherein the image generation device is arranged at a predetermined distance in front of the projection surface.

In another embodiment of the interior equipment system according to the invention, the image generation device has a beamer, such as an LED beamer, laser beamer, for the generation of display contents, which is attached on the side of the second side of the interior trim basic body of the interior trim panel. Preferably, beamers are used which do not need a separate cooling system. The adjustment of the beamer display preferably takes place via optics.

In an embodiment of the interior equipment system according to the invention, the display-covering device is provided with an arresting strap and/or an arresting net, wherein the arresting strap and/or arresting net is fastened on the interior trim basic body, the decorative part and/or a support layer of the interior trim panel. This has the advantage that a tearing off of the display-covering device by the expanding airbag can be prevented. The arresting strap or arresting net is glued onto a side of the display-covering device facing away from the visible side, or is fastened thereon by back injection moulding, with other fastening measures also coming into consideration.

In another embodiment of the interior equipment system according to the invention, the display device section is arranged behind a steering wheel and above a steering wheel holder.

In a further embodiment of the interior equipment system according to the invention, the airbag expansion direction runs through the display device section and through the steering wheel.

Furthermore, the danger exists that in the case of insufficient securing, the support flaps of the steering wheel hub can be torn off from the interior trim panel or the steering wheel hub by an expanding airbag. In addition, in the case of a steering wheel, the danger exists that owing to the proximity of the steering wheel to the driver, the hub flap can injure the vehicle driver whilst being torn open, because, for example, it can hit the hands which are on the steering wheel. This can be avoided by the interior equipment system according to the invention, because steering wheels are used here which permit a passage of the airbag through the opening width of the steering wheel.

BRIEF DESCRIPTION OF THE DRAWINGS

Further advantages, features and details of the invention will emerge from the following description of preferred example embodiments and with the aid of the drawings, showing in:

FIG. 1 a perspective view of an interior trim panel according to the invention and of the interior equipment system for the interior of a vehicle, in particular for the vehicle driver's side of a motor vehicle, FIGS. 2 to 4 different sectional views according to the section course A-A in FIG. 1 of different embodiments of the interior trim panel according to the invention and of the interior equipment system, wherein FIGS. 2a and 3a illustrate diagrammatically the structure of the display-covering device on an enlarged scale, FIGS. 4a to 4c different embodiments of the display-covering receiving device on an enlarged scale, FIG. 5 a perspective view of another example embodiment of the interior trim panel according to the invention and of the interior equipment system, in particular for the passenger side of a motor vehicle, FIGS. 6 to 8 sectional views according to the section course B-B in FIG. 5 of different embodiments of the interior trim panel according to the invention, wherein FIGS. 6a and 7a illustrate diagrammatically the structure of the display-covering device on an enlarged scale, FIGS. 8a to 8c different embodiments of the display-covering receiving device on an enlarged scale, FIGS. 9 and 10 different perspective views of the interior trim panel according to the invention of FIG. 1, wherein on one occasion a U-flap system is illustrated for flapping open a display device section, and on one occasion an H-flap system is illustrated for flapping open the display device section of the interior trim panel according to the invention and of the interior equipment system in an expansion step of an airbag, and FIGS. 11 and 12 different embodiments of a steering wheel and of an airbag for use in the interior trim panel according to the invention and the interior equipment system.

DETAILED DESCRIPTION OF THE ILLUSTRATED EMBODIMENT(S)

Reference is now made to FIGS. 1, 5 and FIGS. 2 to 4 and FIGS. 6 to 8.

Figure 1:
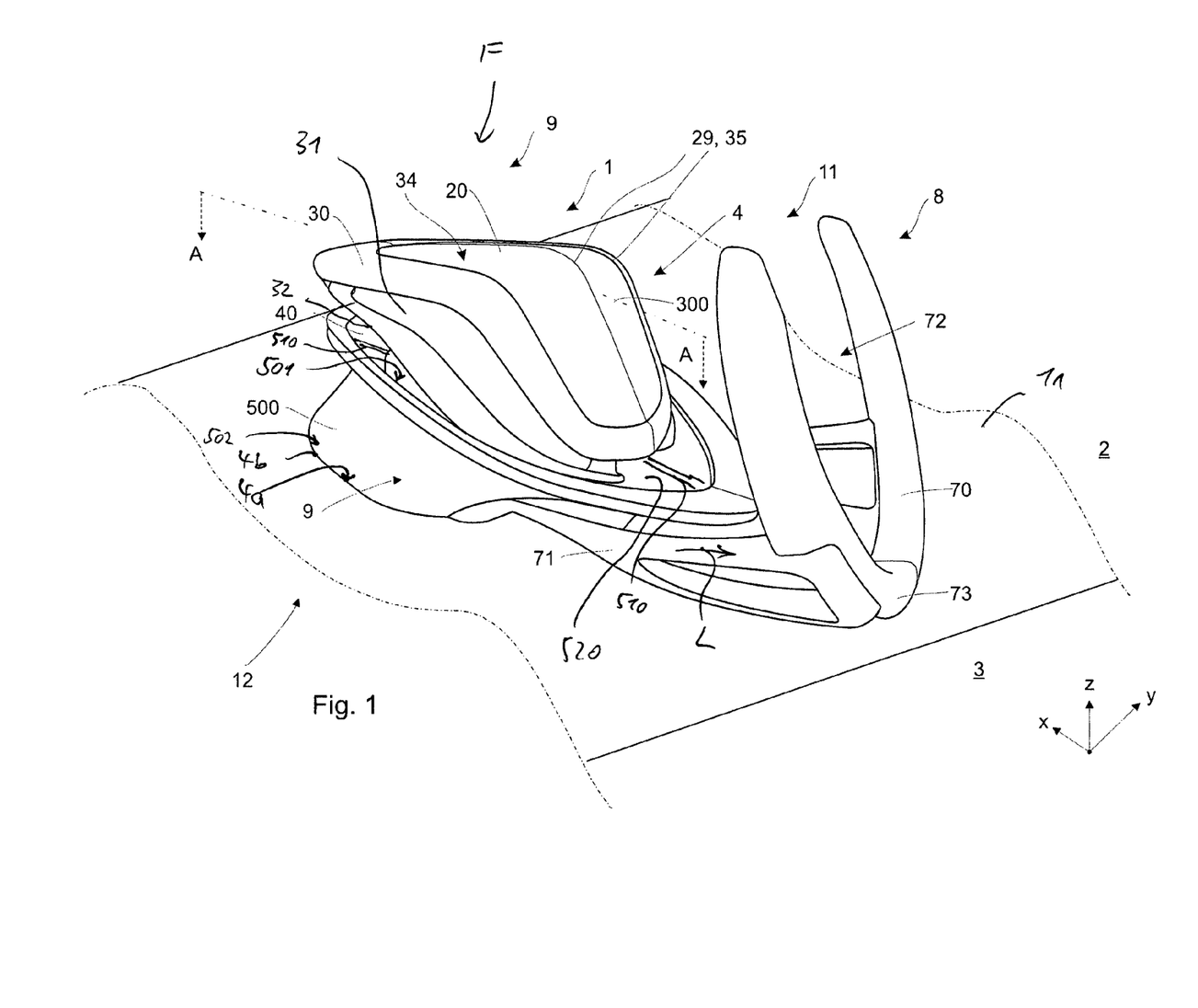

In FIG. 1 an interior trim panel 1 according to the invention and interior equipment system 8 are illustrated. The interior equipment system 8 has the interior trim panel 1 with a first surface 11, which faces the interior or respectively the visible side 2 of a passenger compartment 3 of a motor vehicle and is embodied as a decorative surface. The interior trim panel 1 is a structure extending in a laminar manner and is preferably constructed as an instrument panel or as a part thereof. Generally, the interior trim panel 1 can be an equipment part, can be integrated in a passenger area in the front region or in a rear region of a vehicle interior. The interior trim panel 1 is formed in particular from a support part which is rigid in itself and is stable over the flat extent thereof. The interior trim panel 1 can also have a decorative layer which is laminated onto the support part. The interior equipment system 8 has, furthermore, a cockpit functional unit F. The cockpit functional unit F has a connection part 500, which can be formed as a circumferential shell part and tubular in shape, i.e. forms a through-opening 501. Furthermore, the connection part 500 has a connection section 502 for the fastening of the connection part 500 and therefore of the cockpit functional unit F to a frame part. The frame part can be formed by the support part or the interior trim panel 1, if the latter is formed from the support part as a single layer. The interior trim panel 1 or respectively the support part has an opening 4a, which is formed through a circumferential edge section 4b. The connection section 502 and the circumferential edge section 4b can be formed such that the connection section 502 can be attached in a form-fitting manner on the edge section 4b. Alternatively or additionally, on a body part of the motor vehicle, on which the interior trim panel can be attached with the edge section 4b for fastening in the interior of the vehicle, there can be a receiving device on which the connection section 502 can be attached in a form-fitting manner projecting through the edge section 4b. Provision can be made that the connection section 502 can be additionally fastened by connecting elements on the edge section 4b. Also, the edge section 4b or the receiving device can be embodied such that the connection section 502 can be placed by the edge section 4b or respectively receiving device and can be fastened thereon by connecting elements.

Furthermore, the connection part 500 has a collar part 505 which forms a circumferential collar which projects outwards, viewed from the opening 501.

The cockpit functional unit F has, furthermore, a display component or a basic body 4, which has a circumferential frame 30, embodied as a decorative part, with a fastening device 36 for holding a display device section 20. The frame 30 is placed in one piece or as a separate component on a frame carrier 31 as part of the display component, wherein the frame carrier 31 or respectively the display component 4 can be embodied in a dish-shaped or tube-shaped manner. A connection section 32 of the display component 4 is fastened via a fastening device such as e.g. one or a plurality of struts or by means of fastening elements or connecting elements on the inner side of the connection part 500. Here, an air gap 520 is provided, which in particular can be a circumferential air gap between the connection part 500 and the display component 4, which can be provided as an outlet duct section of a ventilation system.

The fastening device 36 can be realized by a covering receiving device arranged on an inner side 4b of the circumference thereof, in particular in the form of mounts arranged at several positions of the inner side 4b of the circumference thereof, or a circumferential groove. A corresponding edge section of the display-covering device 300 can be received into the fastening device 36, so that the display device section 20 is inserted in the frame 30 and covers the recess 34 (see, for example, FIG. 4 and FIGS. 4a to 4c and FIGS. 8a to 8c). In this way, the display device section 20 can be fastened in form-fitting and force-fitting manner for the formation of the display-covering device 300, wherein the display device section 20 can form in particular a transparent display-covering device. Another example embodiment of the interior trim panel 1 according to the invention and of the interior equipment system 8 is illustrated in FIG. 5.

Figures 3, 3A:
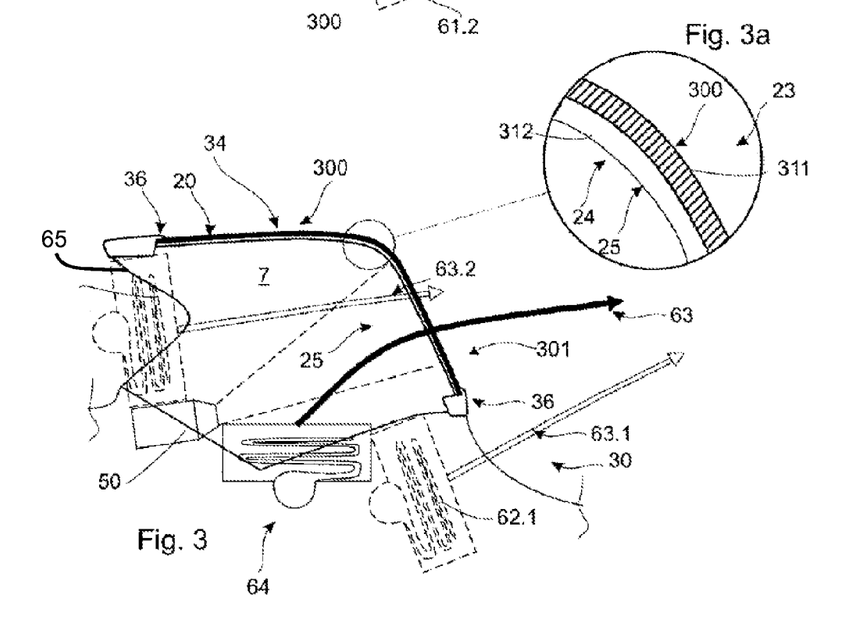
Figures 7, 7A:
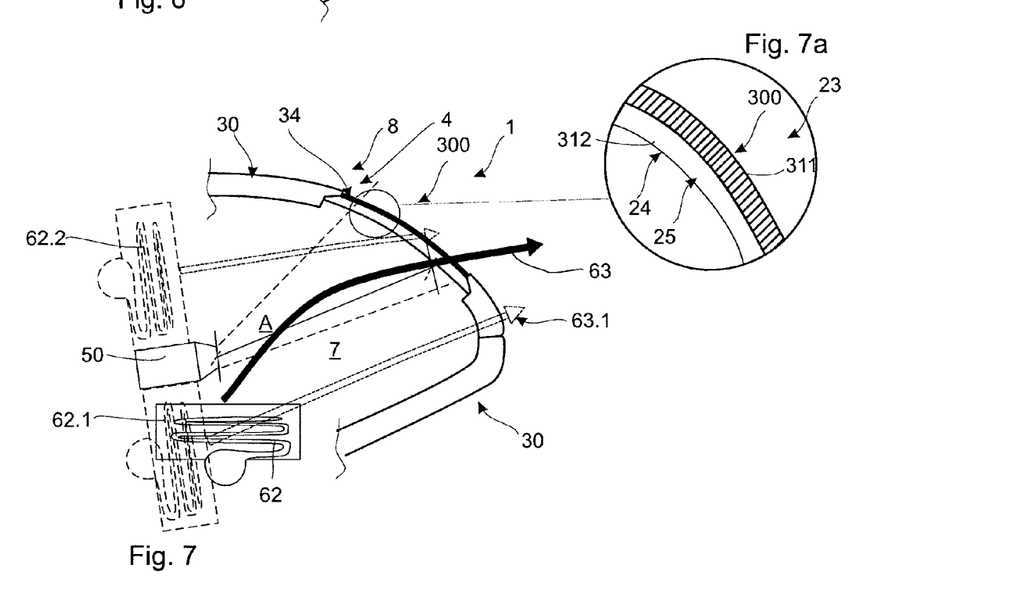

The display-covering device 300 can be produced from a film or from plexiglass, as illustrated on an enlarged scale in FIGS. 3a, 7a, in particular when an image generation device 50 is a beamer or projector. Preferably, the display-covering device 300 is provided with an LED display 301 mounted thereon, which has OLED or AMOLED 302.

In the interior trim panel 1 according to the invention or respectively the interior equipment system 8 according to the invention, shown in FIGS. 3, 4 and FIGS. 7 and 8, a separate display device 301 is allocated to the display-covering device 300. The display device 301 here is preferably an LED beamer or laser beamer 51, which is configured for the generation of electromagnetic beams, in particular light beams, in order to generate an image and/or a display on a projection surface 25 with a projection display side 23 of the display device section 20, which display is visible on the side of the interior 2 of the passenger compartment 3, as shown for example in FIGS. 3, 4 and 7, 8.

Furthermore, the interior trim panel basic body 4 is surrounded in FIG. 1 by a fan opening 40, which is equipped with a special lamellar system for the supply of warm and cold air.

According to an embodiment of the cockpit functional unit F as control device, on the underside, viewed in the opposite z-direction, as indicated with the reference system in FIG. 1, a connection part 500 is situated, which connects the interior trim panel basic body 4 with the first surface 11 of the interior trim panel 1. In addition, a steering wheel holder 71 is attached to the connection part 500 by glueing and/or fastening elements, such that the steering wheel holder 71 extends beneath the display device section 20 towards the steering wheel 70, which is arranged in the interior 2 of the passenger compartment 3 such that a vehicle driver can steer a vehicle by means of the steering wheel 70. In an embodiment, the steering wheel holder 71 can be constructed as an elastic and sufficiently rigid component and can be provided such that along the longitudinal direction of the steering wheel holder 71 in the latter or on a surface thereof, length variation sensors such as strain gauges can be arranged, by which an alteration to the curvature, due to actuation by a driver, can be detected. With connection of a steering function module thereto, through measurement signals formed through the sensors through deflection of the steering wheel holder 71, control signals can be generated for the adjustment of steering wheels of the vehicle.

As can be seen from FIG. 1, the steering wheel holder 71 and the steering wheel 70 extend such that the steering wheel opening width 72 of the steering wheel can be executed for the passage of an expanding airbag 61, which expands out from the display device section 20. For this, the steering wheel 70 is embodied without a hub, and the steering wheel holder 71 engages at a lower end section 73 of the steering wheel holder onto the steering wheel 70, so that the vehicle can be steered via the steering wheel.

Figure 11:
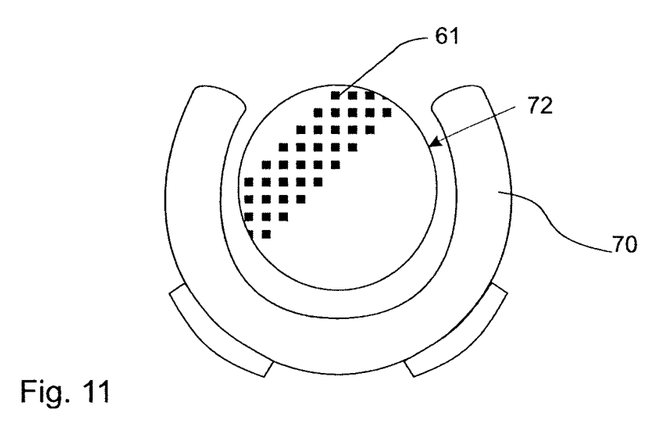
Figure 12:
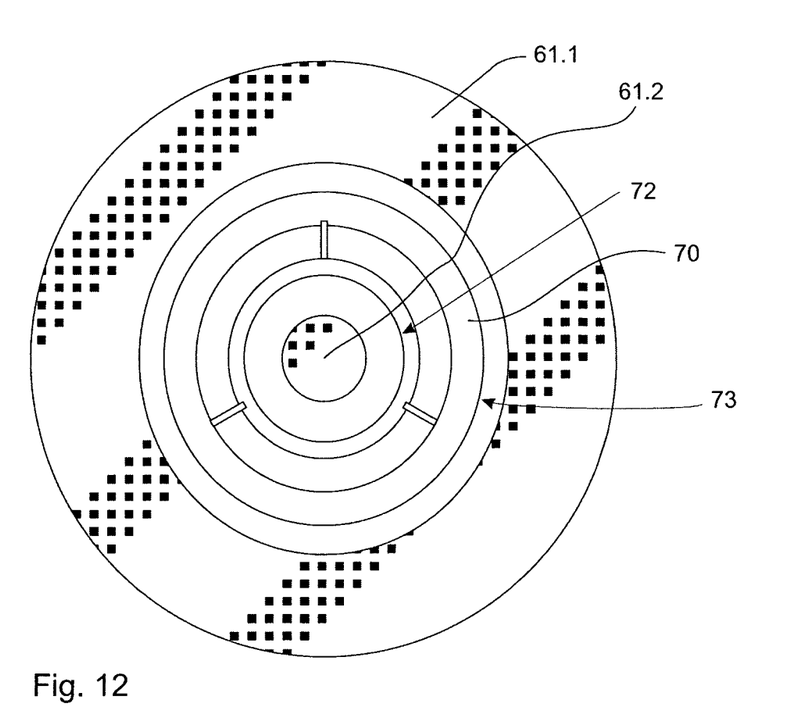

FIGS. 11 and 12 show different embodiments of the steering wheel 70, which can be combined with the interior trim system 8 according to the invention. In the steering wheel shown in FIG. 11, the airbag 61 is in a single piece and passes through the steering wheel opening width 72, whereas the airbag 61.1, 61.2 shown in FIG. 12 is in two parts and can expand once through the steering wheel opening width 72 and the steering wheel circumference 73.

Reference is now made to FIGS. 2 to 4 and 6 to 8.

Figures 2, 2A:
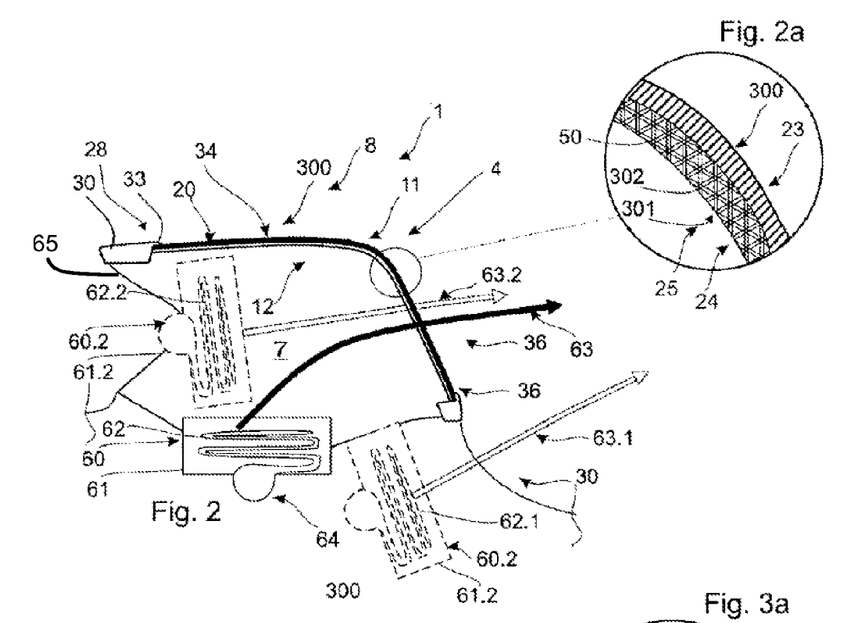
Figure 4:
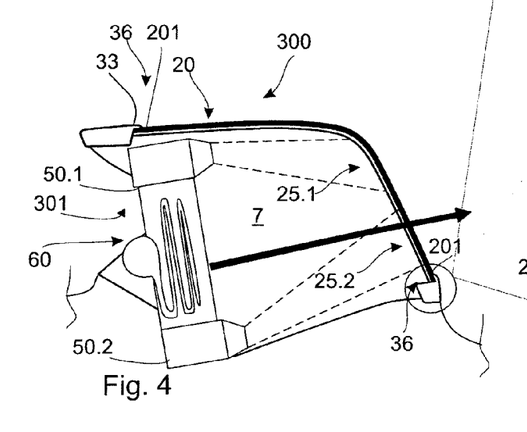
Figure 4A:
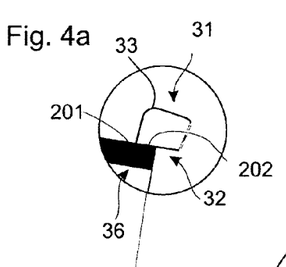
Figure 4B:
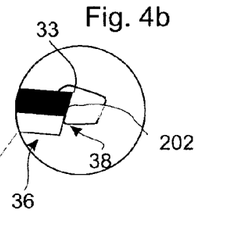
Figure 4C:
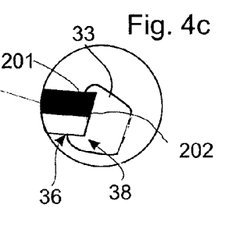
Figure 5:
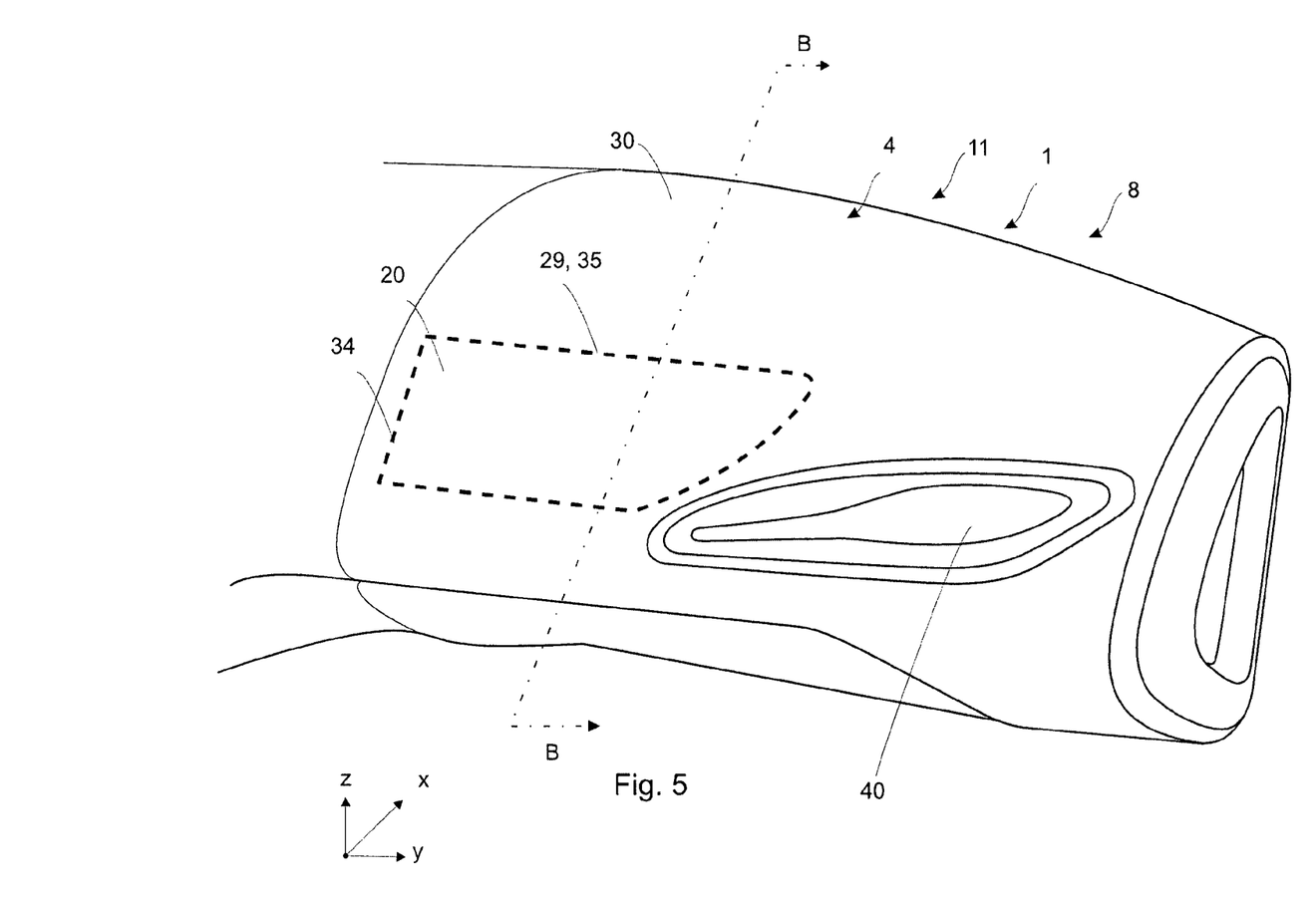
Figures 6, 6A:
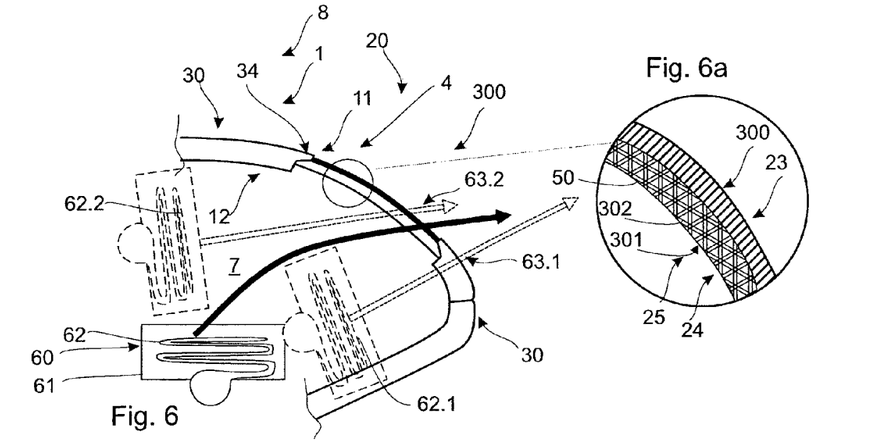

FIGS. 2 to 4 show sectional views according to the section course A-A of FIG. 1, the basic structure of which with regard to a screen device 301 and an airbag module 60 applies especially to the first embodiment of the interior trim panel according to the invention shown in FIG. 1, wherein the principle of the arrangement of the airbag module 60 and of the screen generation device 50 is also able to be used for the embodiment, shown in FIG. 5, of the interior trim panel according to the invention, the sectional views of which ensue from the section course B-B of FIG. 5.

As can be seen for example from FIG. 2, in a second surface 12, which faces away from the first surface 11 of the interior trim panel 1, an airbag module holder 64 (not illustrated) is provided, which is constructed for the fastening of an airbag module 60. The airbag module 60 has an airbag module base part 61 and an airbag 62 which can be filled with gas. The airbag holder 64 is arranged on the second surface of the interior trim panel such that the airbag 62, present in the airbag module 60, can unfold according to the gas bag expansion direction 63, in particular centrally through the recess 34 into the interior 2 of a passenger compartment 3, wherein also other expansion directions 63.1, 63.2 are possible, as indicated in FIGS. 2, 3, 4, 6, 7 and 8.

Alternative expansion paths 63.1 and 63.1, as illustrated in FIGS. 2 to 3, can be produced in that either the airbag module holder 64, and hence the airbag module 60, at the airbag modules 60.1, 60.2 indicated with dashed lines are arranged within the interior 7 formed by the convexity 9. The airbag module retainer or the airbag module holder 64 can be constructed on the inner, second surface 12 of the interior trim panel 1 or respectively the basic body 4 thereof, or separate holders are provided in the vehicle body, such as the bodywork of the vehicle, or corresponding frame structures.

Depending on the position of the airbag module 60, the expansion path 63, 63.1, 63.2 of the airbag 62.1 can also have an expansion direction 63.1 through the decorative part 30. The expansion of the airbag or respectively gas bag 62 takes place preferably according to the gas bag expansion direction 63 through the display device section 20, i.e. the display-covering device 300.

The display device section 20 preferably has a transparent display-covering device 300, which according to a preferred embodiment is produced from a material such as a transparent film, which has a sufficient rigidity so that the film 300 can be pushed through by an expanding airbag 62. Preferably, the film is made of plexiglass, so that the film is self-supporting. When the film 311 is made from plexiglass, a second adhesive film 312 is provided for protection against the formation of fragments, which can prevent a breaking into pieces of the plexiglass when an expanding airbag strikes against the display-covering device 300 which is constructed from plexiglass.

In FIG. 3*a* the structure of such a film 300 is shown, which can be formed from a transparent support material 311 and a suitable shatter-protection layer 312, which can be configured respectively to be transparent and/or partially tinted. Embodiments are also conceivable, in which instead of or in addition to the shatter-protection layer 312, textiles or suitable knitted fabrics or material are provided, which are penetrable by the light beams generated by an image generation device 301, so that on the visible side 2 of the interior trim panel 1 or respectively of the interior equipment system, the image displays or respectively image signals generated by an image generation device 301 are visible, but are opaque from the visible side 2 onto the interior trim panel 1, so that the components present in the interior 7, such as for example the airbag base module 60 and/or an image generation device 50, are not visible for a vehicle occupant.

The textiles or correspondingly suitable materials for the formation of a lamination layer on the decorative part 30 can be arranged both on the visible side 2 or respectively upper side of the interior trim panel 1 over the display device section 20, so that when image generation devices 50 are switched off and are not in operation, the display device section 20 is not visible, but only the lamination layer or skin forming the decorative part 30. It is essential for the materials used for the lamination layer to be penetrable by the light beams generated by the image generation device 50, 50.1, 50.2 at least in the direction towards the passenger compartment 3, so that the information generated by the image generation device 50, 50.1, 50.2 can be seen and read by an observer in the passenger compartment.

Furthermore, according to an embodiment of the interior trim panel according to the invention, the image generation device 50 can be formed from LED (light-emitting diode), in particular a matrix of OLED or AMOLED, so that in addition to the image- and display information, also touchscreen, tactile screen, contact screen or respectively sensor screen characteristics can be provided.

The interior trim body 3 has a convexity 9 in the direction towards the interior 2, in particular on the driver's side, such that both the display device section 20 and also the decorative part 30 are raised from the first surface 11 of the interior trim panel 1. The convexity 9 is formed both by the display device section 20 and from the decorative part 30, which have a corresponding curvature. In a preferred embodiment, in addition a steering wheel holder 71 is formed on the convexity, to hold a steering wheel, wherein the steering wheel holder 71 holds and guides the steering wheel, with steering wheel motion sensors being provided in the steering wheel holder 71, which transmit the steering movements to a control unit, so that a steering of the vehicle by the "steer by wire" principle is possible.

The recess 34 is provided in addition with a receiving device 36 for holding an edge section 201 of the display device section 20. The covering receiving device 36 is preferably formed in an edge section 202 of the decorative part 30. The edge section 30 has a decorative visible side 31 and a decorative inner side 32. At the recess 34 of the decorative section 30 a decorative circumferential edge 33 is constructed, which forms the covering receiving device 36 in an edge section 202 of the decorative section. Preferably, the covering receiving device 36 has partially delimited depressions 38, which are constructed for the form-fitting receiving of the transparent display-covering device 300 of the display device 301. A depression 38 is preferably formed in the covering receiving device 36, which depression can be constructed either partially into the decorative circumferential edge 33 or else can be constructed circumferentially. Preferably, the depression 38 is constructed to receive the display-covering device 300 of the display device 20 such that it can receive the edge section 201 of the display device section in a form-fitting manner.

However, other fastening measures are also conceivable. For example, pins can be constructed in the covering receiving device 36, which pins engages into corresponding through-openings into the edge section 202 of the display-covering device 300. Furthermore, embodiments of the edge sections 201 of the display-covering device 300 and of the edge sections 202 of the covering receiving device 36 are conceivable, which are constructed such that a clipping of the respective edge section into the associated other edge section is possible, as shown for example in FIG. 4c.

The covering receiving device 36 can also be constructed magnetically so that a correspondingly magnetised or magnetisable edge section 201, 202 can be held there sufficiently securely. It is also conceivable in the case of a magnetic edge section 201, 202 that on activation of the airbag 62 the magnetic effect of one of the edge sections 201, 202 is reversed, so that a repelling of the one edge section 201, 202 by the other can take place, so that the display-covering device 300 can flap open, as illustrated for example in FIG. 9.

The edge sections 202 of the decorative circumferential edge 33 and the edge sections 202 of the display-covering device 300 can also be provided with suitable hook-and-loop materials, which permit a flapping open of the display-covering device 300 when an expanding airbag 62, 62.2 expands through the display section 20.

Figure 9:
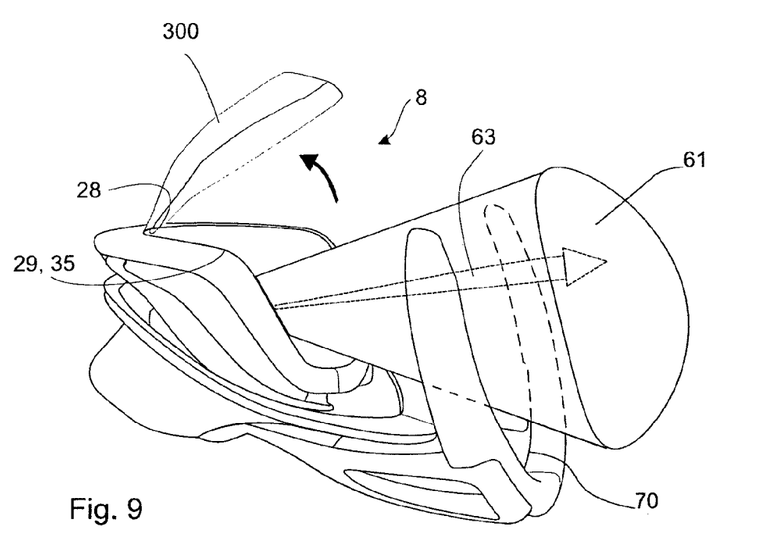
Figure 10:
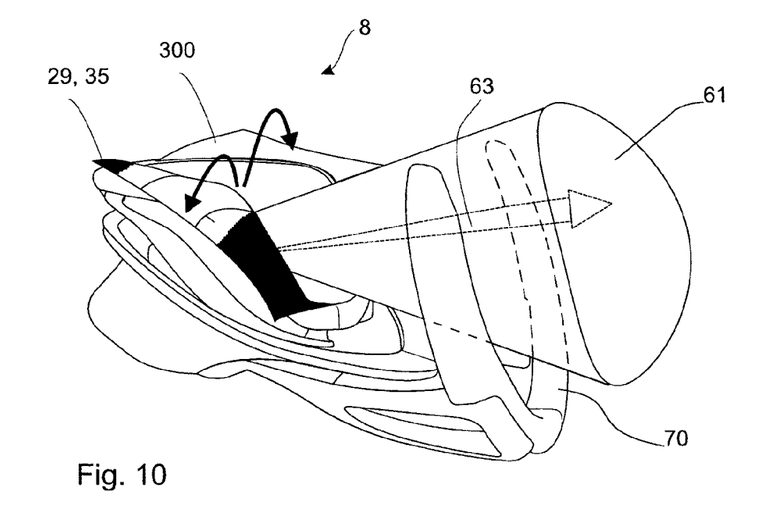

Example embodiments of the interior trim panel 2 and of the interior equipment system 8 are also within the scope of the invention, in which on the edge section 202 of the decorative circumferential edge 33 and/or on the edge section 201 of the display-covering device 300 suitable weakenings or predetermined breaking points 29, 35 are provided, which permit a flapping open of the display-covering device 300 either according to the U-flap system or the K-flap system, as illustrated by way of example in FIGS. 9 and 10, which show respectively an airbag 62 expanding through the steering wheel opening width 72.

Example embodiments of the interior trim panel 2 and of the interior equipment system 8 are also within the scope of the invention, in which the edge section 202 of the decorative circumferential edge 33 is glued together with the edge section 201 of the display-covering device 300, wherein in this case corresponding weakenings 29, 35 can be provided in the decorative circumferential edge 33 and/or in the display-covering device 300.

FIGS. 4a to 4c and FIGS. 8a and 8c show on an enlarged scale different, non-restrictive embodiments of the edge section 202 of the decorative circumferential edge 33, which can be equipped by the above-mentioned measures, so that a display-covering device 300 can be fastened there.

In FIGS. 2, 3, 4 and FIGS. 6, 7, 8 different positions of the airbag module 60 and of the image generation device 50 are illustrated in dashed lines, wherein the alternative positions of the respective airbag module 60 are indicated with 62.1 and 62.1 of the associated airbag. Depending on the position of the respective airbag 62, 62.1, 62.2, corresponding different airbag expansion paths 63, 63.1, 63.2 result, either through the display device section 20 and/or the decorative part 30.

Figure 8:
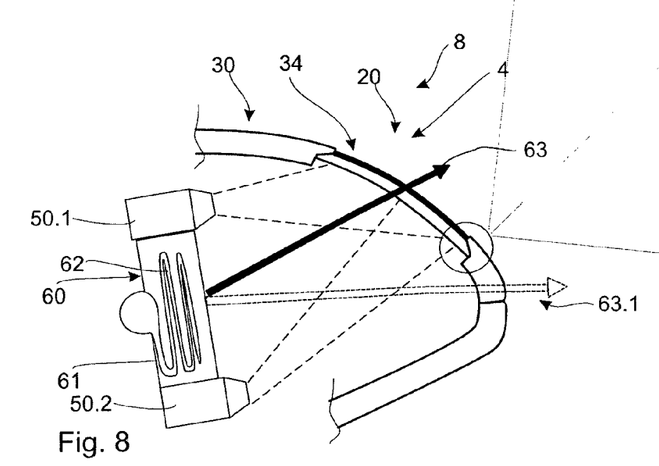
Figure 8A:
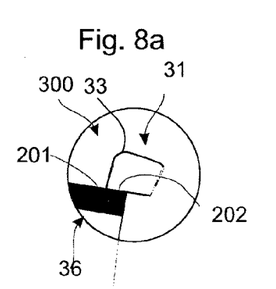
Figure 8B:
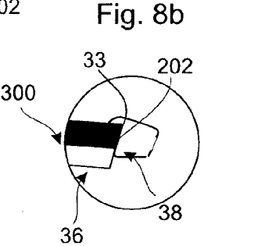
Figure 8C:
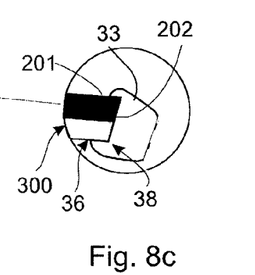

As shown in FIGS. 3 and 8, example embodiments of the interior trim panel 1 and of the interior equipment system 8 are also provided, in which more than one image generation device 50, 50.1, 50.2 are provided on the side of the second surface of the interior trim panel 1, wherein each image generation device 50 can have its own projection surface 25.1, 25.2.

Reference is now made to FIG. 5 and FIGS. 7 and 8.

FIG. 5 shows another example embodiment of the interior trim panel 1 according to the invention and of the interior equipment system 8 according to the invention. The interior trim panel 1 shown in FIG. 5 and of the interior equipment system 8 according to the invention are preferably installed on the passenger side of a vehicle, wherein the example embodiment, shown in FIG. 5, of the interior trim panel 1 according to the invention and of the interior equipment system 8 according to the invention differs from the example embodiment shown in FIG. 1 in that the display section 20 is not arranged in a convexity 9. The components of the interior trim panel 1 and of the interior equipment system 8 shown in the sectional views of FIGS. 6 to 8 and the associated partial views of FIGS. 6a, 7a and FIGS. 8a to 8c therefore show substantially the same components as FIGS. 2 to 4 and FIGS. 2a, 3a and 4a to 4b. The interior trim panel 1 shown in FIGS. 6 to 8 differs substantially only by the form of the interior trim basic body 4 of FIG. 1. Therefore, the feature descriptions regarding the example embodiment of the interior trim panel 1 of FIG. 1 also apply to the example embodiment of the interior trim panel of FIG. 5.

The interior trim panel 1 according to the invention, or respectively the interior equipment system 8 of FIG. 5, has an interior trim panel basic body 4, which has a decorative section 30 extending in a laminar manner, in which a display device section 20 is constructed, which is surrounded by the decorative part 30 and defines a recess 34, in which a covering receiving device 36 is constructed. The covering receiving device 36 is constructed for the form-fitting fastening of a display-covering device 300 of a display device 301. The interior trim panel 1 forms, together with the interior trim body 4, a first surface in which the display device section 20 and the interior trim panel basic body 4 are arranged. Furthermore, on the first surface 11 adjacent to the display device section 20 a fan opening 40 is illustrated.

Reference is now made to FIGS. 9 and 10, which illustrate possible variants for pivoting open and flap systems of the display device section 20. As can be seen from FIGS. 9 and 10, the display device 20 is constructed for pivoting open by an expanding airbag 32. For this, predetermined breaking points or weakenings 35 can be provided on the edge section of the display device 20, which are constructed such that an expanding airbag 62 can break these, so that the display device section can pivot open there. In order to prevent a detaching of the display device section 20 from the decorative circumferential edge 33, a hinge site 28 is provided on the decorative circumferential edge 33, when the display device section is constructed for pivoting open according to a U-flap system. The possible flapping open according to a U-flap system is illustrated in FIG. 3. In order to prevent a tearing off of the display device section 20, arresting straps or arresting nets 65 can be provided, which hold the display device section at the hinge site 28.

In an H-flap system, corresponding predetermined tearing points/weakenings 29, 35 are formed in the display device section 20, so that the display device section 20 can flap open, as illustrated in FIG. 10. It also lies within the scope of the invention that the covering receiving device 36 is constructed such that a corresponding actuation mechanism is provided therein, which frees the edge section 201, 202 at predetermined points, so that the display-covering device 300 can pivot open accordingly, wherein it is ensured that at least one side remains securely connected with the decorative circumferential edge 33.

The interior trim panel 1 according to the invention forms together with the airbag module 60 an interior trim system 8, wherein the airbag module 60 is attached by means of the airbag holder 64 on a second surface 12, which is applied to the first surface 11 of the interior trim panel 1. In addition to the airbag module 60, the interior trim system 8 can have an image generation device 500. For this purpose, the display device section 22 has a projection surface 25 and a projection display side 23.

In a preferred embodiment, an LED device is arranged between the projection surface 25 and the projection display side 23. In this case, the display device section 20 is preferably fastened to the decorative circumferential edge 33 by means of a pivoting section 28, for example in the form of a film hinge, so that the display device section 20 can be pivoted open by an expanding airbag.

The image generation device 50 can, however, also be a projector which is arranged with a predetermined distance A in front of the projection surface 25. The image generation device 50 can be a beamer, in particular an LED beamer, a laser beamer, respectively with a suitable size and heat development for vehicle construction, which can generate information display content on the projection display side. If beamers or projectors are used as image generation device 50, the display device section 20 is preferably constructed from a film, in particular a transparent film, which reflects for the light beams generated from the beamer such that corresponding image symbols can be generated on the visible side of the interior, so that a vehicle driver and/or a passenger can read the information.

The invention claimed is:

1. An interior trim panel for the interior of a motor vehicle with a first surface, constructed as a visible side, and a second surface situated opposite thereto, the interior trim panel comprising:
   an interior trim panel basic body with a recess and with a fastening device for the fastening of a display-covering device of a display device section,
   an airbag module holder for the fastening of an airbag module, the airbag module holder being situated in the region of the display device section and is arranged on the second surface of the interior trim panel,
   wherein the display device section is arranged behind a steering wheel and above a steering wheel holder when the vehicle interior panel is installed in the motor vehicle.

2. The interior trim panel according to claim 1, wherein the airbag module holder is attached to the second surface of the interior trim panel such that an airbag contained in an airbag module base part can be deployed into the interior through the recess.

3. The interior trim panel according to claim 1, wherein the airbag module holder is attached to the second surface of the interior trim panel such that an airbag contained in an airbag module base part can be deployed through a decorative circumferential edge of the interior trim panel basic body adjoining the display device section and defining the recess.

4. The interior trim panel according to claim 1, wherein a decorative part of the interior trim panel basic body extends over the recess.

5. The interior trim panel according to claim 1, wherein the display device section is constructed for pivoting open by an expanding airbag, and a pivoting device is constructed on a decorative circumferential edge of a decorative part, about which the display device section is pivoted open by the expanding airbag, and a covering receiving device or predetermined breaking points of the display device section are constructed on the decorative circumferential edge of the decorative part.

6. The interior trim panel according to claim 1, wherein the display device section is constructed as a U-flap system for pivoting open by an expanding airbag.

7. The interior trim panel according to claim 1, wherein the display device section is constructed as an H-flap system for pivoting open by an expanding airbag.

8. The interior trim panel according to claim 1, wherein a predetermined tearing point/weakening is formed in the interior trim panel basic body, in a decorative part and/or in the display device section, such that an expanding airbag can push open the display device section.

9. The interior trim panel according to claim 1, wherein a covering receiving device for detachable holding of the display device section is constructed on a decorative circumferential edge defining the recess, such that the covering receiving device frees a lateral edge of the display device section held by the covering receiving device when an expanding airbag strikes against the display device section or is activated.

10. An interior equipment system for the interior of a motor vehicle, the interior equipment system comprising:
    an interior trim panel with a first surface forming a visible side when the interior trim panel is installed in the motor vehicle and a second surface lying opposite to said first surface,
    wherein the interior trim panel comprises an interior trim panel basic body with a basic body opening and a fastening device for the fastening of a display device section,
    an airbag module holder arranged at the second surface of the interior trim panel,
    an airbag module fastened to the airbag module holder, the airbag module comprising an airbag,
    a steering wheel holder coupled to the interior trim panel, and
    a steering wheel having a steering wheel opening width and being coupled to the steering wheel holder,
    wherein, when seen in plan view, the display device section is arranged behind the steering wheel and above the steering wheel holder so that the airbag is deployable into the interior of the vehicle along an airbag expansion direction which runs through the display device section and through the steering wheel opening width.

11. The interior equipment system according to claim 10, wherein the airbag module is attached to the airbag module holder on the second surface of the interior trim panel such that the airbag is contained in an airbag module base part and can be deployed into the interior through the basic body opening.

12. The interior equipment system according to claim 10, wherein the airbag module holder is attached on the second surface of the interior trim panel such that the airbag is contained in the airbag module base part and can be deployed through a decorative circumferential edge of a decorative part, which adjoins the display device section.

13. The interior equipment system according to claim 12, wherein the display device section has a projection display side which faces the interior of the passenger compartment and has a projection surface, wherein an image generation device is arranged in the projection surface.

14. The interior equipment system according to claim 13, wherein the image generation device is an OLED, AMOLED device, which is integrated in the projection surface.

15. The interior equipment system according to claim 10, wherein the display device section is arranged pivotably on a decorative part by a pivoting section such that the display device section is able to be pivoted open by an expanding airbag.

16. The interior equipment system according to claim 10, wherein the display device section has a projection display side which faces the interior of the passenger compartment and a projection surface, wherein an image generation device is arranged at a predetermined distance from the projection surface.

17. The interior equipment system according to claim 16, wherein the image generation device comprises a beamer, for the generation of display contents, which is attached on the second side of the interior trim panel basic body of the interior trim panel.

18. The interior equipment system according to claim 10, wherein the section is provided with an arresting strap and/or an arresting net, wherein the arresting strap and/or arresting net is fastened on the interior trim panel basic body, the decorative part and/or a support layer of the interior trim panel.

19. An interior trim panel for the interior of a motor vehicle, the interior trim panel comprising:
- an interior trim panel basic body with a first surface as a visible side, and a second surface situated opposite thereto, wherein the interior trim panel basic body comprises a basic body opening,
- an airbag module holder for the fastening of an airbag module with an airbag, wherein the airbag module holder is arranged on the second surface of the interior trim panel,
- a connection part of tubular shape, comprising a connection section and a collar part, wherein the connection section of the connection part is connected to the basic body opening so that a through-opening is defined by an inner surface of the connection section and so that the connection part extends from the first surface of the interior trim panel basic body, and wherein the collar part is connected to the connection section of the connection part and projects outwards from the connection part, viewed along the through-opening thereby forming a collar of the connection part,
- a decorative part of a display base body connected to the connection part in a manner such that the connection part is arranged between the interior trim panel basic body and the decorative part, wherein a decorative circumferential edge with a fastening device defines a recess, wherein the fastening device is designed for fastening of a display device section.

20. The interior trim panel according to claim 19, wherein the display device section has a projection display side which faces the interior of the passenger compartment and has a projection surface, wherein an image generation device is arranged in the projection surface.

* * * * *